United States Patent
Cochran

(10) Patent No.: US 9,873,784 B2
(45) Date of Patent: Jan. 23, 2018

(54) POLYMER COMPOSITIONS BASED ON SMMA

(71) Applicant: INEOS STYROLUTION GROUP GMBH, Frankfurt (DE)

(72) Inventor: Thomas W. Cochran, Channahon, IL (US)

(73) Assignee: INEOS STYROLUTION GROUP GMBH (DE)

( * ) Notice: Subject to any disclaimer, the term of this patent is extended or adjusted under 35 U.S.C. 154(b) by 0 days.

(21) Appl. No.: 15/035,859

(22) PCT Filed: Nov. 10, 2014

(86) PCT No.: PCT/EP2014/074135
§ 371 (c)(1),
(2) Date: May 11, 2016

(87) PCT Pub. No.: WO2015/071207
PCT Pub. Date: May 21, 2015

(65) Prior Publication Data
US 2016/0289438 A1    Oct. 6, 2016

(30) Foreign Application Priority Data
Nov. 12, 2013   (EP) .................................. 13192422

(51) Int. Cl.
| C08L 53/02 | (2006.01) |
| C08L 25/14 | (2006.01) |
| B65D 81/34 | (2006.01) |

(52) U.S. Cl.
CPC .......... *C08L 25/14* (2013.01); *B65D 81/3461* (2013.01); *C08L 53/02* (2013.01); *C08L 2201/08* (2013.01); *C08L 2203/12* (2013.01); *C08L 2205/03* (2013.01); *C08L 2205/035* (2013.01)

(58) Field of Classification Search
CPC ........... C08L 2205/03; C08L 2205/035; C08L 53/02; C08L 25/14; C08L 71/12
See application file for complete search history.

(56) References Cited

U.S. PATENT DOCUMENTS

| 3,257,357 | A | 6/1966 | Stamatoff |
| 3,257,358 | A | 6/1966 | Stamatoff |
| 3,306,874 | A | 2/1967 | Hay |
| 3,306,875 | A | 2/1967 | Hay |
| 3,383,435 | A | 5/1968 | Cizek |
| 4,481,332 | A | 11/1984 | Somemiya et al. |
| 4,604,415 | A | 8/1986 | Hambrecht et al. |
| 4,762,874 | A | 8/1988 | Hambrecht et al. |
| 6,031,053 | A | 2/2000 | Knoll et al. |
| 6,197,889 | B1 | 3/2001 | Knoll et al. |
| 2002/0042474 | A1* | 4/2002 | Court .................... C08L 25/06 525/88 |
| 2009/0124750 | A1* | 5/2009 | Hong .................... C08L 25/14 524/505 |
| 2010/0152384 | A1* | 6/2010 | Toneri .................. C08F 297/02 525/66 |

FOREIGN PATENT DOCUMENTS

| GB | 1325884 A | 8/1973 |
| GB | 1455589 A | 11/1976 |
| KR | 20030054168 A | 7/2003 |
| WO | 95/35335 A1 | 12/1995 |
| WO | 97/40079 A1 | 10/1997 |

OTHER PUBLICATIONS

English Abstract of KR 20030054168, publication date of Jul. 2, 2003, accessed espace.net on Aug. 11, 2016.

* cited by examiner

*Primary Examiner* — Jeffrey Mullis
(74) *Attorney, Agent, or Firm* — J.A. Lindeman & Co., PLLC

(57) ABSTRACT

The invention is directed to polymer compositions comprising components (a), (b), (c) and (d): (a) 80 to 97% by weight of component (a) comprising a copolymer (a1) of styrene (a11) and methyl methacrylate (a12), wherein the amount present of (a11) is from 70 to 90% by weight and the amount present of (a12) is from 10 to 30% by weight, based in each case on (a1), (b) 3 to 20% by weight of polyphenylene ether as component (b); (c) 0 to 2% by weight of polystyrene as component (c); (d) 0 to 17%, in particular 0 to 15% by weight of conventional additives as component (d), having improved heat resistance, surface hardness, depth of color and gloss.

12 Claims, No Drawings

POLYMER COMPOSITIONS BASED ON SMMA

The invention relates to polymer compositions, based on styrene/methylmethacrylate-copolymers, with improved heat resistance, surface hardness, depth of color and gloss, to their use, and also to thermoplastic moldings, fibers, and foils produced therefrom.

SMMA (copolymers of styrene and methylmethacrylate) and blends of SMMA and SBC (copolymers of styrene and butadiene) are known thermoplastic materials which are commercially available.

Said products have appealing characteristics such as stellar clarity and toughness, but some properties such as the heat resistance and the susceptibility to surface scratching or marring (i.e. surface hardness) are not satisfying for many applications. Furthermore, in some cases, attempts to improve the heat and scratch resistance had the effect of sacrificing some or all clarity of said materials.

One example is the use of impact modified SMMA for interior automotive trim. The superior toughness and high surface gloss are very appealing, but temperatures reached inside a close automobile may exceed the upper limit possible for the material. Scratch resistance is also a concern for this application.

Several prior art documents disclose blends of polystyrenes based on styrene homo- or copolymers and polyphenylene ether resins. According to U.S. Pat. No. 3,383,435 the compositions can comprise from 99 to 1% by weight styrene resin and from 1 to 99% by weight polyphenylene ether resin. Compositions containing from 60 to 15% by weight styrene resin (preferably SAN, ABS and HIPS) and 40 to 85% by weight PPE are preferred.

GB patent application 1 325 884 discloses thermoplastic compositions comprising from 50 to 95% by weight of a polyphenylene ether resin (PPE) and 5 to 50% by weight of an acrylic impact modifier, being a graft copolymer based on butadiene or butadiene/styrene as back-bone polymer and an acrylic polymer grafted thereon. The polyphenylene ethers are preferably blends with styrene resins, such as styrene homopolymers (PS), styrene-butadiene-copolymers, HIPS, ABS copolymers and SAN copolymers. In said blends the amount of PPE is 40 to 85% by weight and the amount of the styrene resin is 60 to 15% by weight.

GB-A 1 455 589 deals with thermoplastic compositions comprising PPE and a rubber modified polystyrene (HIPS) having a particulate polybutadiene rubber phase dispersed in a polystyrene matrix. Preferred polystyrenes are in particular homopolystyrene and copolymers of styrene such as SAN, SMMA etc. The compositions can comprise from 1 to 99% by weight polyphenylene ether resin and from 99 to 1%, preferably 20 to 80%, in particular preferred 40 to 60% by weight polystyrene resin, on a rubber free basis. The rubber phase of the compositions varies from 0.1 to 30%, preferred is from 1 to 15%.

KR-A 20030054168 discloses a flame retardant rubber-reinforced polystyrene resin composition which comprises 70-94.5 wt % of a rubber-reinforced polystyrene resin; 0.5-10 wt % of a polyphenylene ether resin; and 5-20 wt % of a phosphoric acid ester compound. Preferably the rubber-reinforced polystyrene resin comprises an aromatic vinyl monomer and an alkylester monomer of the (meth)acrylic acid and a diene- or acrylate-based rubber.

The afore-mentioned resin compositions of the prior art require further improvement in respect to gloss, appealing depth of color, and resistance to heat distortion.

Thus, it is an object of the invention to provide a polymer composition with improved heat resistance, surface hardness, depth of color and gloss which can be used for many applications.

According to the invention, the object is achieved via a polymer composition comprising (or consisting of) components (a), (b), (c) and (d):
(a) 80 to 97% by weight of component (a) comprising a copolymer (a1)) of styrene (a11) and methyl methacrylate (a12), wherein the amount present of (a11) is from 70 to 90% by weight and the amount present of (a12) is from 10 to 30% by weight, based in each case on (a1),
(b) 3 to 20% by weight of polyphenylene ether as component (b);
(c) 0 to 2% by weight of polystyrene as component (c);
(d) 0 to 17%, in particular 0 to 15% by weight of conventional additives as component (d);
wherein the total amount of components (a) and (b) and, if appropriate, (c) and (d) is 100% by weight.

According to the invention, it has been found that a specific styrene copolymer comprising methylmethacrylate units, optionally blended with styrene/diene-block-copolymers, in combination with a PPE resin in a specific amount leads to the ad-vantages of the invention.

The amount of component (a) comprised in the polymer composition according to the invention is preferably from 80 to 96% by weight, more preferably from 82 to 96% by weight, in particular from 85 to 95% by weight.

The amount of component (b) comprised in the polymer composition according to the invention is preferably from 4 to 18% by weight, more preferably from 4 to 16% by weight, in particular from 5 to 15% by weight.

If component (c) is present, the amount of component (b) comprised in the polymer composition according to the invention is preferably from 4 to 18% by weight, more preferably from 4 to 16% by weight, in particular from 5 to 13.5% by weight.

The amount of component (c) comprised in the polymer composition according to the invention is preferably from 0 to 1.5% by weight, more preferred from 0 to 1.0% by weight. If component (c) is present, its minimum amount comprised is usually 0.1% by weight.

If component (c) is present, the amount of component (c) comprised in the polymer composition according to the invention is generally from 0.1 to 2% by weight, preferably from 0.1 to 1.5% by weight, more preferred from 0.1 to 1.0% by weight. The amount of component (c) is in particular preferred zero.

If in the inventive polymer composition component (c) is present in an amount of from 0.1 to 2% by weight, preferably from 0.1 to 1.5% by weight, the amount of component (b) is preferably from 4 to 18% by weight, more preferably from 4 to 16% by weight, in particular from 5 to 13.5% by weight, and the amount of component (a) is preferably from 80 to 95.9% by weight, more preferably from 82 to 95.9% by weight, in particular from 85 to 94.9% by weight.

The amount of component (d) comprised in the polymer composition according to the invention is not critical and is usually from 0 to 17% by weight, often 0 to 15% by weight, preferably from 0 to 14% by weight, more preferably from 0 to 10% by weight, in particular from 0 to 5% by weight. If component (d) is present, its minimum amount is 0.1% by weight.

The amount of component (d) is in one embodiment of the invention zero %.

Component (a)

Component (a) comprises (or consists of) one or more copolymers (a1)) of styrene (a11) and methyl methacrylate (a12), wherein the amount present of (a11) is from 70 to 90% by weight and the amount present of (a12) is from 10 to 30% by weight, based in each case on (a1). Preferred are copolymers (a1)) wherein the amount present of (a11) is from 70 to 85% by weight and the amount present of (a12) is from 15 to 30% by weight. In particular preferred are copolymers (a1)) wherein the amount present of (a11) is from 70 to 80% by weight and the amount present of (a12) is from 20 to 30% by weight. Most preferred are copolymers (a1)) wherein the amount present of (a11) is from 84 to 80% by weight and the amount present of (a12) is from 20 to 26% by weight.

Said SMMA copolymers (a1)) are known products which are commercially available from Styrolution (Frankfurt, Germany) as NAS® 21, NAS® 30, and NAS® 90.

Component (a) can additionally comprise at least one block copolymer (a2) of styrene (a21) and butadiene (a22), wherein the total amount present of (a21) is from 40% to 90% by weight and the total amount present of (a22) is from 10% to 60% by weight, based in each case on (a2).

The total amount of butadiene (a22) is preferably in the range from 15 to 50% by weight, particularly preferably in the range from 20 to 40% by weight, and the total amount of styrene (a21) is correspondingly preferably in the range from 50 to 85% by weight, particularly preferably in the range from 60 to 80% by weight, based in each case on (a2).

Such a block copolymer (a2) preferably comprises a linear or star-shaped styrene-butadiene block copolymer with external polystyrene blocks S and, between these, one or more styrene-butadiene copolymer blocks having random styrene/butadiene distribution $(S/B)_{random}$, or with a styrene gradient $(S/B)_{taper}$.

The at least one styrene-butadiene (S/B) block is preferably composed of from 30 to 75% by weight of styrene and from 25 to 70% by weight of butadiene. The S/B-block particularly preferably has a butadiene content of from 35 to 70% by weight and a styrene content of from 30 to 65% by weight.

The proportion of the polystyrene blocks S is preferably in the range from 40 to 80% by weight, in particular in the range from 50 to 75% by weight, based on the entire block copolymer. The proportion of the copolymer blocks S/B is preferably in the range from 20 to 60% by weight, in particular in the range 25 to 50% by weight.

Particular preference is given to linear styrene-butadiene block copolymers of general structure S-(S/B)-S having, located between the two S blocks, one or more blocks $(S/B)_{random}$ having random styrene/butadiene distribution. These block copolymers are obtainable via anionic polymerization in a non-polar solvent with addition of a polar cosolvent or of a potassium salt, as described by way of example in WO 95/35335 or WO 97/40079.

Vinyl content is relative content of 1,2-linkages of the diene units, based on the entirety of 1,2-, 1,4-cis-, and 1,4-trans-linkages. The 1,2-vinyl content in the styrene-butadiene copolymer block (S/B) is preferably below 20%, in particular in the range from 10 to 18%, particularly preferably in the range from 12 to 16%.

Said SB block copolymers (a2) are known products which are commercially available from Styrolution company as Styrolux® 3G55, Styrolux® 684D, Styrolux®3G33. The weight ratio of SBC block copolymer (a2) to SMMA copolymer (a1)) is generally from 0 to 4, preferably from 0.2 to 4, more preferred 0.2 to 2.6, in particular preferred 0.6 to 1.5.

If a SBC block copolymer (a2) is present, generally a blend of SMMA copolymer (a1) and said SBC block copolymer (a2) is used as component (a) in the polymer composition according to the invention.

According to the invention the polymer phases of the SMMA copolymers (a1)) and the SB block copolymers (a2) are preferably matched in regard to their refractive index resulting in a blend with high clarity.

In particular preferred component (a) is a blend of a SMMA copolymer (a1)) and SB block copolymer (a2) wherein the values of the refractive indexes of (a1)) and (a2) differ no more than 0.01.

Component (b)

The polyphenylene ethers used for this invention are known and described in U.S. Pat. Nos. 3,306,874, 3,306, 875, 3,257,357 and 3,257,358.

The polyphenylene ethers are self-condensation products of monohydric monocyclic phenols produced by reacting the phenols with oxygen in the presence of complex copper catalysts. In general, molecular weight will be controlled by reaction time, longer times providing a higher average number of repeating unit.

A preferred family of polyphenylene ethers has repeating structural units of the formula:

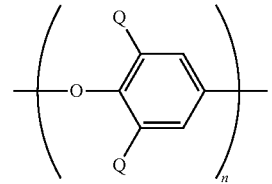

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

For purposes of the present invention an especially preferred family of polyphenylene ethers includes those having alkyl substitution in the two positions ortho to the oxygen ether atom, i.e., those of the above formula wherein each Q is alkyl, most preferably having from 1 to 4 carbon atoms. Illustrative members of this class are: poly(2,6-dimethyl-1, 4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

A further preferred polyphenylene ether resin for purposes of the present invention is poly(2,6-dimethyl-1,4-phenylene) ether.

Component (c)

As component (c) thermoplastic standard polystyrene, a styrene homopolymer, is used which is available and sold as General Purpose Polystyrene (GPPS) by Styrolution company (Germany, Frankfurt).

Component (d)

Conventional additives (d), except for further impact modifiers, may be included in the inventive compositions, such as processing aids (e.g. conventional dispersing agents, such as low-molecular-weight waxes, e.g. polyethylene waxes, or stearates, such as magnesium stearate or calcium stearate), plasticizers, pigments, flame retardant additives, reinforcing agents, such as glass filaments or fibers, and stabilizers.

Preferred is an inventive polymer composition consisting of components (a), (b), and, if appropriate, (c) and (d).

According to one embodiment of the invention preferred are polymer compositions comprising (or consisting of):
- (a) 80 to 95.9% by weight of component (a) comprising a copolymer (a1)) of styrene (a11) and methyl methacrylate (a12), wherein the amount present of (a11) is from 70 to 90% by weight and the amount present of (a12) is from 10 to 30% by weight, based in each case on (a1),
- (b) 4 to 18% by weight of polyphenylene ether as component (b);
- (c) 0.1 to 2% by weight of polystyrene as component (c);
- (d) 0 to 15.9% by weight of conventional additives as component (d);

wherein the total amount of components (a), (b), (c) and, if appropriate, (d) is 100% by weight.

According to one further embodiment of the invention preferred are polymer compositions comprising (or consisting of):
- (a) 82 to 96% by weight of component (a) comprising or consisting of a copolymer (a1)) of styrene (a11) and methyl methacrylate (a12), wherein the amount present of (a11) is from 70 to 90% by weight, preferably from 70 to 85% by weight, and the amount present of (a12) is from 10 to 30% by weight, preferably from 15 to 30% by weight, based in each case on (a1),
- (b) 4 to 18% by weight of polyphenylene ether as component (b);
- (c) 0% by weight of polystyrene as component (c);
- (d) 0 to 14% by weight of conventional additives as component (d), wherein the total amount of components (a), (b), and, if appropriate, (c) and (d) is 100% by weight.

According to one further embodiment of the invention preferred are polymer compositions comprising (or consisting of):
- (a) 82 to 95.9% by weight of component (a) comprising or consisting of a copolymer (a1)) of styrene (a11) and methyl methacrylate (a12), wherein the amount present of (a11) is from 70 to 90% by weight, preferably from 70 to 85% by weight, and the amount present of (a12) is from 10 to 30% by weight, preferably from 15 to 30% by weight, based in each case on (a1),
- (b) 4 to 16% by weight of polyphenylene ether as component (b);
- (c) 0.1 to 2% by weight of polystyrene as component (c);
- (d) 0 to 13.9% by weight of conventional additives as component (d), wherein the total amount of components (a), (b), (c) and, if appropriate, (d) is 100% by weight.

Even more preferred are inventive polymer compositions comprising (or consisting of):
- (a) 85 to 95% by weight of component (a) comprising or consisting of a copolymer (a1)) of styrene (a11) and methyl methacrylate (a12), wherein the amount present of (a11) is from 70 to 90% by weight, preferably from 70 to 85% by weight, and the amount present of (a12) is from 10 to 30% by weight, preferably from 15 to 30% by weight, based in each case on (a1),
- (b) 5 to 15% by weight of polyphenylene ether as component (b);
- (c) 0% by weight of polystyrene as component (c);
- (d) 0 to 10% by weight of conventional additives as component (d), wherein the total amount of components (a) and (b) and, if appropriate, (c) and (d) is 100% by weight.

According to one further embodiment of the invention preferred are inventive polymer compositions comprising (or consisting of):
- (a) 85 to 94.9% by weight of component (a) comprising or consisting of a copolymer (a1) of styrene (a11) and methyl methacrylate (a12), wherein the amount present of (a11) is from 70 to 90% by weight, preferably from 70 to 85% by weight, and the amount present of (a12) is from 10 to 30% by weight, preferably from 15 to 30% by weight, based in each case on (a1),
- (b) 5 to 13.5% by weight of polyphenylene ether as component (b);
- (c) 0.1 to 1.5% by weight of polystyrene as component (c);
- (d) 0 to 9.9% by weight of conventional additives as component (d), wherein the total amount of components (a), (b), (c) and, if appropriate, (d) is 100% by weight.

According to a further embodiment of the invention preferred are polymer compositions comprising (or consisting of):
- (a) 80 to 97%, preferably 82 to 96% by weight of component (a), consisting of a copolymer (a1)) of styrene (a11) and methyl methacrylate (a12) wherein the amount present of (a11) is from 70 to 90% by weight, preferably from 70 to 85% by weight, and the amount present of (a12) is from 10 to 30% by weight, preferably from 15 to 30% by weight, based in each case on (a1),
  and a block copolymer (a2) of styrene (a21) and butadiene (a22), wherein the amount present of (a21) is from 40 to 90%, preferably 50 to 85% by weight and the amount present of (a22) is from 10 to 60%, preferably 15 to 50% by weight, based in each case on (a2), and the weight ratio of (a1)) to (a2) being from 0.2 to 4, preferably from 0.2 to 2.6,
- (b) 3 to 20%, preferably 4 to 18% by weight of polyphenylene ether as component (b);
- (c) 0% by weight of polystyrene as component (c);
- (d) 0 to 17%, preferably 0 to 14% by weight of conventional additives as component (d),
  wherein the total amount of components (a), (b) and, if appropriate, (c) and (d) (d) is 100% by weight.

According to a further embodiment of the invention preferred are polymer compositions comprising (or consisting of):
- (a) 80 to 95.9% by weight, preferably 80 to 95.8% by weight of component (a), consisting of a copolymer (a1) of styrene (a11) and methyl methacrylate (a12) wherein the amount present of (a11) is from 70 to 90% by weight, preferably from 70 to 85% by weight, and the amount present of (a12) is from 10 to 30% by weight, preferably from 15 to 30% by weight, based in each case on (a1),
  and a block copolymer (a2) of styrene (a21) and butadiene (a22), wherein the amount present of (a21) is from 40 to 90%, preferably 50 to 85% by weight and the amount present of (a22) is from 10 to 60%, preferably 15 to 50% by weight, based in each case on (a2), and the weight ratio of (a1)) to (a2) being from 0.2 to 4, preferably from 0.2 to 2.6, (b) 4 to 18% by weight of polyphenylene ether as component (b);

(c) 0.1 to 2% by weight, preferably 0.2 to 2% by weight of polystyrene as component (c);

(d) 0 to 15.9% by weight, 0 to 15.8% by weight of conventional additives as component (d), wherein the total amount of components (a), (b), (c) and, if appropriate, (d) is 100% by weight.

Even more preferred are inventive polymer compositions comprising (or consisting of):

(a) 85 to 95% by weight of component (a) consisting of
a copolymer (a1)) of styrene (a11) and methyl methacrylate (a12), wherein the amount present of (a11) is from 70 to 90% by weight, preferably from 70 to 85% by weight, and the amount present of (a12) is from 10 to 30% by weight, preferably from 15 to 30% by weight, based in each case on (a1), and
a block copolymer (a2) of styrene (a21) and butadiene (a22), wherein the amount present of (a21) is from 60 to 80% by weight and the amount present of (a22) is from 20 to 40% by weight, based in each case on (a2), and the weight ratio of (a1) to (a2) being from 0.6 to 1.5, (b) 5 to 15% by weight of polyphenylene ether as component (b);

(c) 0% by weight of polystyrene as component (c);

(d) 0 to 10% by weight of conventional additives as component (d), wherein the total amount of components (a), (b) and, if appropriate, (c) and (d) is 100% by weight.

Furthermore preferred are inventive polymer compositions comprising (or consisting of):

(a) 85 to 94.8% by weight of component (a) consisting of
a copolymer (a1)) of styrene (a11) and methyl methacrylate (a12), wherein the amount present of (a11) is from 70 to 90% by weight, preferably from 70 to 85% by weight, and the amount present of (a12) is from 10 to 30% by weight, preferably from 15 to 30% by weight, based in each case on (a1), and
a block copolymer (a2) of styrene (a21) and butadiene (a22), wherein the amount present of (a21) is from 60 to 80% by weight and the amount present of (a22) is from 20 to 40% by weight, based in each case on (a2), and the weight ratio of (a1)) to (a2) being from 0.6 to 1.5, (b) 5 to 13.5% by weight of polyphenylene ether as component (b);

(c) 0.2 to 1.5% by weight of polystyrene as component (c);

(d) 0 to 9.8% by weight of conventional additives as component (d), wherein the total amount of components (a), (b), (c) and, if appropriate, (d) is 100% by weight.

In particular preferred are inventive polymer compositions according to the afore-mentioned embodiments comprising as component (a) a blend of a SMMA copolymer (a1)) and SB block copolymer (a2) wherein the values of the refractive indexes of (a1) and (a2) differ preferably no more than 0.01.

The afore-mentioned inventive polymer compositions are of a particular clarity and achieve an improved depth of color.

Mixing processes known per se may be used to prepare the inventive polymer composition e.g. by addition of component (b) and, if appropriate, (c) and (d) to a melt of component (a). For this purpose it is advantageous to use extruders, e.g. single-screw or twin-screw extruders, or other conventional plasticizers, such as Brabender mixers or Banbury mixers.

The preferred method is one in which the polyphenylene ether (b) is mixed with component (a), comprising SMMA copolymer (a1)) or, if present, a blend of (a1)) with SB block copolymer (a2) and, if present, components (c) and (d) in the melt using any conventional mixing methods and the composition so formed is molded to any desired shape as by extrusion and hot molding.

The inventive polymer compositions show an improved heat resistance and scratch resistance, moreover the appearance in regard to gloss and, when colored, the appealing depth of color is retained.

Accordingly a further subject of the invention is a molding, fiber or foil comprising the inventive polymer composition.

The inventive moldings, fibers or foils have improved properties in respect to heat resistance and surface hardness having the advantage that they can used for many applications.

A further subject of the invention is the use of a molding, fiber or foil comprising the inventive polymer composition in the household and automobile sector. The moldings, fibers and foils can in particular be used as microwave package for food or for an interior automotive trim.

The examples below and the patent claims provide further explanation of the invention.

EXAMPLES

Starting Materials
Component (a)

| | |
|---|---|
| SMMA 21.5 | (styrene-methylmethacrylate-copolymer with a methylmethacrylate content of 21.5% by weight; refractive Index, sodium D line = 1.57) |
| SMMA 24 | (styrene-methylmethacrylate-copolymer with a methylmethacrylate content of 24% by weight; refractive Index, sodium D line = 1.57) |
| SMMA 30 | (styrene-methylmethacrylate-copolymer with a methylmethacrylate content of 30% by weight; refractive Index, sodium D line = 1.56) |
| SB | Styrolux 3G55 (styrene-butadiene block copolymer from Styrolution company; refractive Index, sodium D line = 1.57) |

Component (b)
PPE poly (2,6-dimethyl-1,4-phenylene) ether
Component (c)
PS GPPS
Test Methods:

Modulus of elasticity, tensile stress at break, and tensile strain at break were determined in the tensile test to ASTM D638.

The melt flow rate was determined to ASTM D1238.

The heat resistance of the specimens was determined by means of the Vicat softening point. The Vicat softening point was determined to ASTM 1525, using a force of 10 N and a temperature rise of 120 K per hour, on standard small specimens. The deflection temperature under load was determined to ASTM D648.

The hardness according to Rockwell was determined to ASTM D785.

The gloss was determined in accordance with ASTM D523.

Polymer Compositions:

Components (a), (b), and (c) were compounded in accordance with the amounts given in tables 1 to 4 to give polymer compositions according to examples 1 to 12. The components were mixed at a melt temperature of from 240 to 260° C. in a twin-screw extruder. The melt was passed through a water bath and pelletized.

Table 1 lists the properties of inventive polymer compositions comprising SMMA (21.5% MMA) and PPE.

TABLE 1

| | | Example No. | | | | |
|---|---|---|---|---|---|---|
| | Units | Comparative 1.0 | 1.05 | 1.10 | 1.15 | 1.20 |
| SMMA 21.5 | wt.-% | 100 | 95 | 90 | 85 | 80 |
| Polyphenylene Ether | wt.-% | 0 | 4.5 | 9 | 13.5 | 18 |
| Polystyrene | wt.-% | 0 | 0.5 | 1 | 1.5 | 2 |
| Melt flow rate | g/10 min. | 2.2 | 2.0 | 1.6 | 1.2 | 0.9 |
| Vicat Softening Point, B10 | ° C. | 103.6 | 106.6 | 107.7 | 111.1 | 114.3 |
| Deflection temperature under load [1.82 Mpa, 264 psi] | ° C. | 98.7 | 100.2 | 101.4 | 102.5 | 103.2 |
| Tensile modulus | kpsi | 470 | 449 | 444 | 449 | 457 |
| Tensile stress at break | psi | 8153 | 7592 | 8227 | 7864 | 7720 |
| Hardness, Rockwell | M Scale | 63.9 | 63.3 | 68.2 | 67.9 | 69.9 |

Table 2 shows the properties of inventive polymer compositions comprising SMMA (24% MMA), SBC and PPE.

TABLE 2

| | | Example No. | | | | |
|---|---|---|---|---|---|---|
| | Units | Comparative 2.0 | 2.05 | 2.10 | 2.15 | 2.20 |
| SMMA 24 | wt.-% | 45.0 | 40.0 | 35.0 | 30.0 | 25.0 |
| SBC A | wt.-% | 55.0 | 55.0 | 55.0 | 55.0 | 55.0 |
| Polyphenylene Ether | wt.-% | 0.0 | 4.5 | 9.0 | 13.5 | 18.0 |
| Polystyrene | wt.-% | 0.0 | 0.5 | 1.0 | 1.5 | 2.0 |
| Melt flow rate | g/10 min. | 4.7 | 3.3 | 2.1 | 1.2 | <.90 |
| Vicat Softening Point, B10 | ° C. | 87.5 | 97.8 | 102.9 | 106.2 | 111.1 |
| Deflection temperature under load [1.82 Mpa, 264 psi] | ° C. | 82.9 | 92.1 | 93.8 | 98.5 | 100.1 |
| Tensile modulus | kpsi | 195 | 237 | 278 | 294 | 277 |
| Tensile stress at yield | psi | 2578 | 3262 | 4036 | 4687 | 5132 |
| Tensile stress at break | psi | 3141 | 3495 | 3849 | 4235 | 4416 |
| Tensile strain at break | % | 78 | 63 | 57 | 58 | 56 |
| Hardness, Rockwell | R Scale | 35.9 | 58.0 | 75.5 | 87.8 | 92.1 |
| Gloss at 20° | % | 121.0 | 97.9 | 85.4 | 73.1 | 97.7 |
| Gloss at 60° | % | 122.4 | 117.8 | 112.3 | 106.1 | 113.7 |

Table 3 shows the properties of inventive polymer compositions comprising SMMA (30% MMA) and PPE.

TABLE 3

| | | Example No. | | | | |
|---|---|---|---|---|---|---|
| | Units | Comparative 3.0 | 3.05 | 3.10 | 3.15 | 3.20 |
| SMMA 30 | wt.-% | 100 | 95 | 90 | 85 | 80 |
| Polyphenylene Ether | wt.-% | 0 | 5 | 10 | 15 | 20 |
| Melt flow rate | g/10 min. | 2.2 | 2.0 | 1.6 | 1.5 | 0.9 |
| Vicat Softening Point, B10 | ° C. | 102.9 | 103.7 | 105.0 | 105.3 | 106.9 |
| Deflection temperature under load [1.82 Mpa, 264 psi, standard] | ° C. | 99.8 | 100.5 | 100.8 | 101.1 | 101.7 |

TABLE 3-continued

| | | Example No. | | | | |
|---|---|---|---|---|---|---|
| | Units | Comparative 3.0 | 3.05 | 3.10 | 3.15 | 3.20 |
| Tensile modulus | kpsi | 462 | 444 | 443 | 442 | 454 |
| Tensile stress at break | psi | 7913 | 7669 | 7977 | 7524 | 7431 |
| Hardness, Rockwell | M Scale | 62.0 | 64.0 | 65.2 | 64.7 | 66.3 |

Table 4 shows the properties of inventive polymer compositions comprising SMMA (30% MMA), SBC and PPE.

| | | Example No. | | | | |
|---|---|---|---|---|---|---|
| | Units | Comparative 4.0 | 4.05 | 4.10 | 4.15 | 4.20 |
| SMMA 30 | wt.-% | 45.0 | 40.0 | 35.0 | 30.0 | 25.0 |
| SBC B | wt.-% | 55.0 | 55.0 | 55.0 | 55.0 | 55.0 |
| Polyphenylene Ether | wt.-% | 0.0 | 5.0 | 10.0 | 15.0 | 20.0 |
| Melt flow rate | g/10 min. | 5.36 | 1.93 | <.5 | <.5 | <.5 |
| Vicat Softening Point, B10 | °C. | 95.4 | 97.5 | 104.5 | 97.6 | 118.1 |
| Deflection temperature underload [1.82 Mpa, 264 psi, standard] | °C. | 88.3 | 89.6 | 91.9 | 92.2 | 95.2 |
| Notched Izod impact strength | ft-lb/in | 8.3 | 9.0 | 4.8 | 3.5 | 0.8 |
| Tensile modulus | kpsi | 230 | 219 | 196 | 219 | 191 |
| Tensile stress at yield | psi | 2913 | 3067 | 3727 | 4193 | 4199 |
| Tensile stress at break | psi | 3090 | 2976 | 3338 | 3612 | 3663 |
| Tensile strain at break | % | 56 | 62 | 84 | 74 | 72 |
| Hardness, Rockwell | R Scale | 39.8 | 41.4 | 64.1 | 74.5 | 77.8 |

Tables 1 to 4 contain data demonstrating the benefit of the inventive polymer compositions on heat and scratch resistance.

The inventive polymer compositions show an increase in heat resistance as demonstrated by an increase in its Vicat softening point and its deflection temperature under load. Surface hardness of the compositions is also improved as evidenced by an increase in Rockwell hardness. Furthermore Table 2 demonstrates that the appearance in regard to gloss of the products was retained.

The invention claimed is:

1. Polymer composition comprising components (a), (b), (c) and (d):
   (a) 80 to 97% by weight of component (a) consisting of a copolymer (a1) of styrene (a11) and methyl methacrylate (a12), wherein the amount present of (a11) is from 70 to 90% by weight and the amount present of (a12) is from 10 to 30% by weight, based in each case on (a1), and at least one block copolymer (a2) of styrene (a21) and butadiene (a22), wherein the total amount present of (a21) is from 40% to 90% by weight and the total amount present of (a22) is from 10% to 60% by weight, based in each case on (a2);
   (b) 3 to 20% by weight of polyphenylene ether as component (b);
   (c) 0 to 2% by weight of polystyrene as component (c);
   (d) 0 to 17% by weight of conventional additives as component (d);
   wherein the total amount of components (a) and (b) and, if present, (c) and (d) is 100% by weight.

2. Polymer composition according to claim 1 wherein component (a) consists of copolymer (a1) and of block copolymer (a2), and wherein the weight ratio of SBC block copolymer (a2) to SMMA copolymer (a1) is from 0.2 to 4.

3. Polymer composition according to claim 1 wherein the amount present of (a21) is from 50 to 85% by weight and the amount present of (a22) is from 15 to 50% by weight, based in each case on (a2), and wherein the weight ratio of SBC block copolymer (a2) to SMMA copolymer (a1) is from 0.2 to 2.6.

4. Polymer composition according to claim 1 wherein component (a) is a blend of copolymer (a1) and block copolymer (a2) wherein the values of the refractive indexes of (a1) and (a2) differ no more than 0.01.

5. Polymer composition according to claim 1 wherein the amount present of (a) is from 80 to 95.9% by weight, the amount of (b) is from 4 to 18% by weight, the amount of (c) is from 0.1 to 2% by weight and the amount of (d) is 0 to 15.9% by weight.

6. Polymer composition according to claim 1 wherein the amount present of (a) is from 82 to 96% by weight, and the amount of (b) is from 4 to 18% by weight, the amount of (c) is 0% by weight and the amount of (d) is from 0 to 14% by weight.

7. Polymer composition according to claim 1 wherein the amount present of (a) is from 82 to 95.9% by weight, the amount of (b) is from 4 to 16% by weight, the amount of (c) is from 0.1 to 2% by weight and the amount of (d) is 0 to 13.9% by weight.

8. Polymer composition according to claim 1 wherein the amount present of (a) is from 85 to 95% by weight, the amount of (b) is from 5 to 15% by weight, the amount of (c) is 0% by weight and the amount of (d) is from 0 to 10% by weight.

9. Polymer composition according to claim 1 wherein the amount present of (a) is from 85 to 94.9% by weight, the amount of (b) is from 5 to 13.5% by weight, the amount of (c) is from 0.1 to 1.5% by weight and the amount of (d) is from 0 to 9.9% by weight.

10. A molding, fiber or foil comprising a polymer composition according to claim claim 1.

11. A microwave package for food comprising a molding, fiber or foil according to claim 10.

12. An interior automotive trim comprising a molding, fiber or foil according to claim 10.

* * * * *